(12) United States Patent
Hall

(10) Patent No.: US 8,695,931 B2
(45) Date of Patent: Apr. 15, 2014

(54) LEVELING DEVICE FOR PORTABLE STOVE

(76) Inventor: John Ernest Hall, Napa, CA (US)

( * ) Notice: Subject to any disclaimer, the term of this patent is extended or adjusted under 35 U.S.C. 154(b) by 0 days.

(21) Appl. No.: 13/374,989

(22) Filed: Jan. 27, 2012

(65) Prior Publication Data

US 2013/0193285 A1   Aug. 1, 2013

(51) Int. Cl.
*F16M 11/24* (2006.01)
*F16M 11/20* (2006.01)

(52) U.S. Cl.
USPC ..................... 248/188.2; 248/188.7

(58) Field of Classification Search
USPC ........ 248/188.2, 188.4, 188.6, 188.7, 346.05, 248/172, 533, 528, 439; 99/449; 280/35; 126/30, 1 R, 24, 25 R, 29, 25 AA
See application file for complete search history.

(56) References Cited

U.S. PATENT DOCUMENTS

| | | | | |
|---|---|---|---|---|
| 123,756 A * | 2/1872 | Woodruff | .................... | 280/35 |
| 189,531 A * | 4/1877 | Voorhees | .................... | 280/35 |
| 208,650 A * | 10/1878 | Tucker | .................... | 280/35 |
| 217,172 A * | 7/1879 | Tucker | .................... | 280/35 |
| 226,997 A * | 4/1880 | Green et al. | .................... | 280/35 |
| RE9,283 E * | 7/1880 | Woodruff | .................... | 280/35 |
| 234,336 A * | 11/1880 | Schenck | .................... | 280/35 |
| 241,809 A * | 5/1881 | Long, | .................... | 280/35 |
| 378,135 A * | 2/1888 | Hess | .................... | 280/35 |
| 442,825 A * | 12/1890 | Randall | .................... | 280/35 |
| 525,298 A * | 8/1894 | Thiele et al. | .................... | 280/35 |
| 878,043 A * | 2/1908 | Chrisman | .................... | 248/616 |
| 1,151,291 A * | 8/1915 | Sampson | .................... | 211/27 |
| 1,350,963 A * | 8/1920 | Fowler | .................... | 248/172 |
| 1,853,318 A * | 4/1932 | Peters | .................... | 280/35 |
| 1,890,729 A * | 12/1932 | Ganson | .................... | 248/167 |
| 2,158,546 A * | 5/1939 | Lang et al. | .................... | 248/167 |
| 2,534,367 A * | 12/1950 | Perrotta et al. | .................... | 280/35 |
| 2,654,421 A * | 10/1953 | Neff | .................... | 280/35 |
| 2,730,373 A * | 1/1956 | Blevins et al. | .................... | 280/35 |
| 2,739,776 A * | 3/1956 | Terando | .................... | 108/54.1 |
| 2,763,491 A * | 9/1956 | Shafer, Jr. | .................... | 280/35 |
| 3,288,479 A * | 11/1966 | Ullman | .................... | 280/35 |
| 3,430,973 A * | 3/1969 | Vartanian et al. | .................... | 280/35 |
| 3,952,983 A * | 4/1976 | Crochet | .................... | 248/173 |
| 4,166,638 A * | 9/1979 | De Prado | .................... | 280/638 |
| 4,406,437 A * | 9/1983 | Wright | .................... | 248/529 |
| D286,255 S * | 10/1986 | Gage | .................... | D7/332 |
| 4,743,039 A * | 5/1988 | Ellis | .................... | 280/42 |
| 4,955,873 A * | 9/1990 | Rajlevsky | .................... | 604/322 |
| 5,492,301 A * | 2/1996 | Hauser | .................... | 248/516 |
| 6,407,351 B1 * | 6/2002 | Meyer et al. | .................... | 177/238 |
| 6,719,250 B2 * | 4/2004 | FitzSimons | .................... | 248/166 |

(Continued)

*Primary Examiner* — Jonathan Liu
*Assistant Examiner* — Guang H Guan
(74) *Attorney, Agent, or Firm* — Berenato & White, LLC

(57) ABSTRACT

A leveling device for a portable stove with a first and second spine member each having a slot, four arms and four metal threaded posts. The spine members can slide in or out to create a long or short spine. The elongate arms each have a slot and are each pinned through the slots of the arms to each end of the spine members. The threaded posts are each screwed into mating threaded apertures at each end of the arms. The four elongate arms can be rotated and extended or retracted to accommodate the size of the base of a portable stove so that the portable stove may be placed on top of the spine and arms and that the threaded posts can be adjusted in right to accommodate any irregularities in terrain that the stove would otherwise be resting upon.

6 Claims, 7 Drawing Sheets

(56) References Cited

U.S. PATENT DOCUMENTS 6,964,423 B1 * 11/2005 Chieh et al. ............... 280/79.11
7,287,732 B2 * 10/2007 Balistreri .................. 248/188.4
2009/0236479 A1 * 9/2009 Rose ......................... 248/188.7

* cited by examiner

LEVELING DEVICE FOR PORTABLE STOVE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of leveling devices and more specifically to a leveling device for portable stove.

Portable stoves are commonly used during camping activities. They are usually gas powered and may have one or more burners.

When setting up a camping stove on an irregular surface such as the natural ground or a sloped table top, it becomes necessary to level the cooking surface of the stove so that pots or pans placed upon the stove will sit in a level horizontal orientation. It would therefore be ideal to have a device that can help level the stove no matter what the angle of the surface under the stove, Leveling devices such as threaded metal posts have been incorporated into the underside of various home or commercial appliances so that the top of the appliance is level in the horizontal plane. However, an independent adjustable leveling device that can be adjusted to the base of most common portable stoves, and can be folded for compact storage, has not been available to date.

BRIEF SUMMARY OF THE INVENTION

The primary object of the invention is to provide a leveling device for portable stoves that allows the stove to be placed on a non level surface and be adjusted to be level for use.

Another object of the invention is to provide a leveling device for portable stoves that can adjust to easily attach to the underside of portable stoves of various sizes and models.

Another object of the invention is to provide a leveling device for portable stoves that folds compactly for shipping and storage.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a leveling device for a portable stove comprising: a first rigid spine elongate member, a second rigid spine elongate member, four rigid elongate arms, four metal threaded posts, said first elongate spine member having a centrally located elongate slot, said second elongate spine member having an integral tab portion at one end, said tab portion having an aperture that accepts a threaded screw, said threaded screw slidably fixed to said elongate slot in said first elongate spine member, said elongate arms each having a centrally located elongate slot, said elongate arms each rotatably pinned through said elongate slots of said arms to each end of said first elongate spine member and said second elongate spine member, said four metal threaded posts each screwed into mating threaded apertures at each distal end of said elongate arms, said first and second spine elongate members capable of being extended in relation to each other via said elongate slot in said first elongate spine member, and said four rigid elongate arms capable of being rotated and extended or retracted to accommodate the size of the base of any standard portable stove so that said portable stove can be placed on top of said first and second spine members and said four arms and said threaded posts can be adjusted to accommodate any irregularities in terrain that the said stove would otherwise be resting upon.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
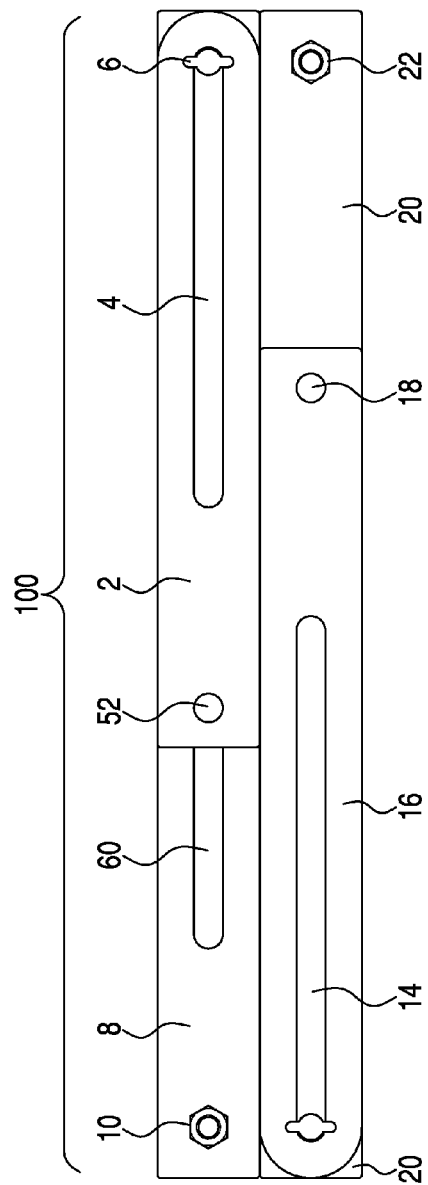
FIG. 1 is a top plan view of the invention in the closed position.
Figure 4:
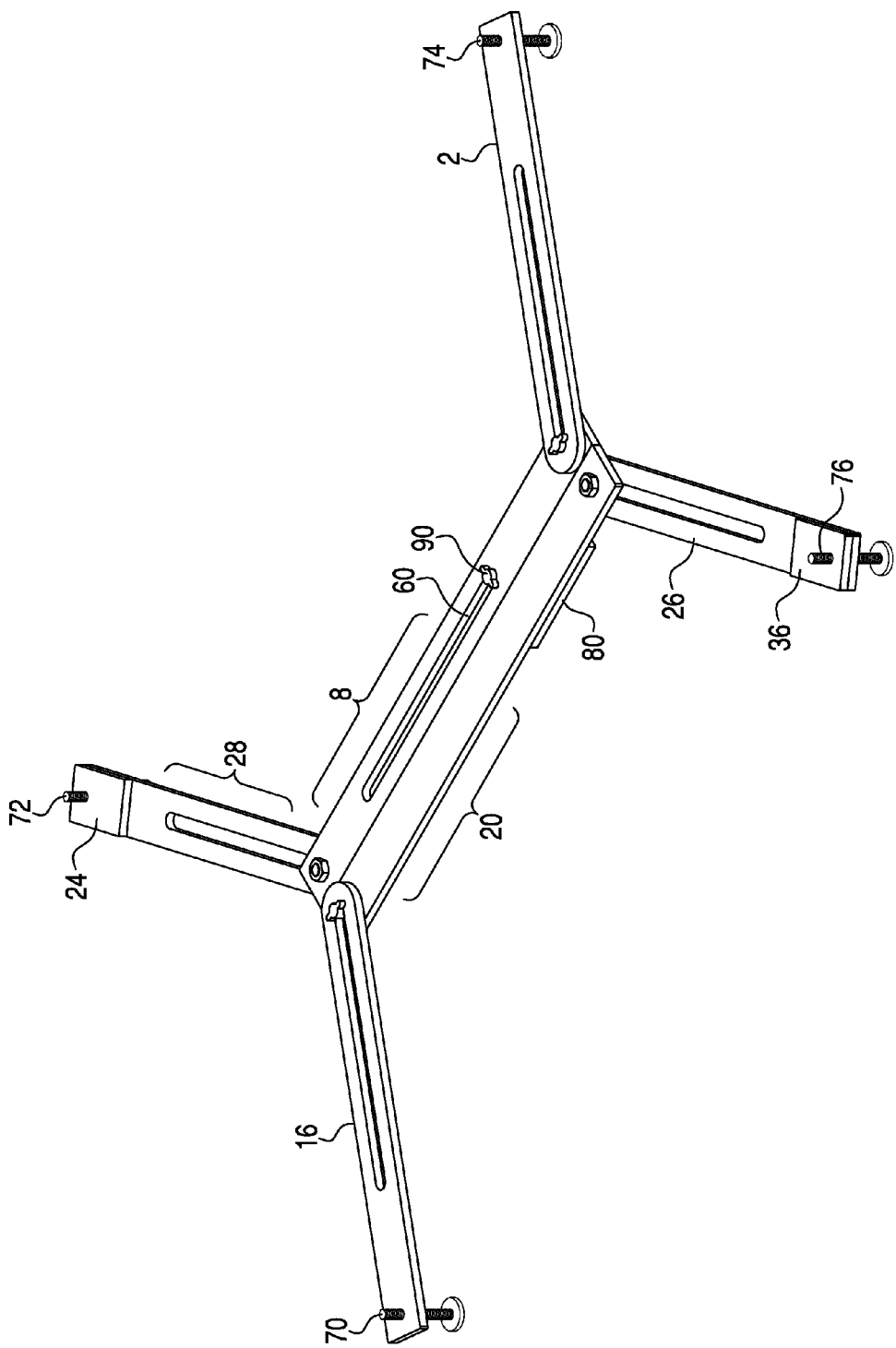
FIG. 4 is a perspective view of the invention in the use position.
Figure 5:
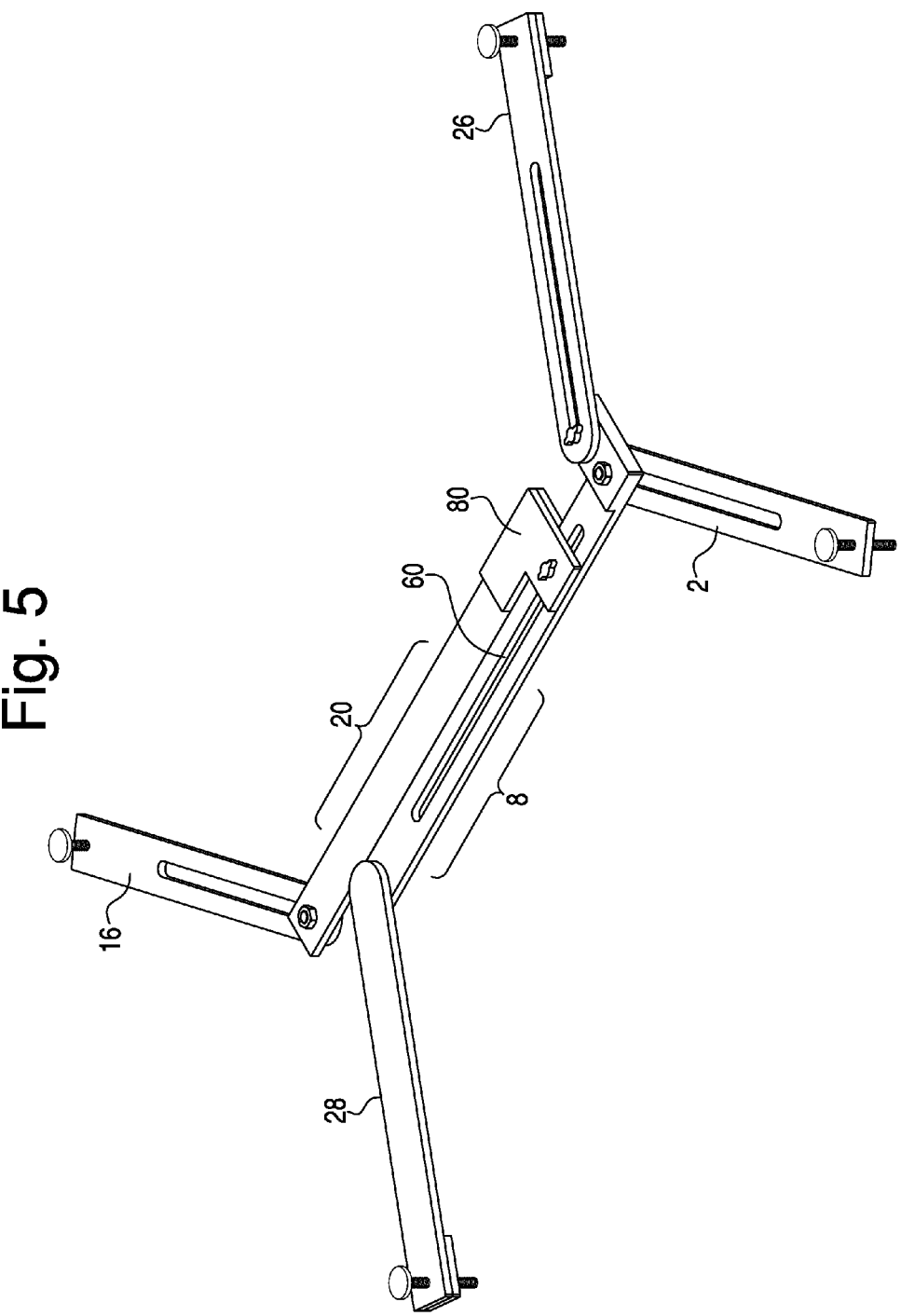
FIG. 5 is a perspective view of the invention with arms slightly retracted for a smaller stove.

Referring now to FIG. 1 a top view of the invention 100 is shown. The invention is made of a series of relatively flat, elongate members that are pinned together. Arms 2 and 16 include slots 4, 14 and are pinned to a central elongate spine 20, 8 via pin members 10, 22. The pin members 10, 22 are made of threaded posts which terminate is thumb screws, such as thumb screw 6 in FIG. 1 and thumb screws 40, 46 in FIG. 2, so the user can loosen the thumb screws, rotate out the arms 2, 16 and tightened the thumb screws to lock in place in the use position as shown in FIGS. 4 and 5. Threaded apertures 18, 52 allow the user to insert a threaded post and foot 70, 74 as shown in FIG. 4. It should be noted that an alternate embodiment can use a series of evenly spaced apertures located in each elongate member in place of slots. This embodiment can be seen in the alternate embodiment shown in FIGS. 7 and 8.

Figure 2:
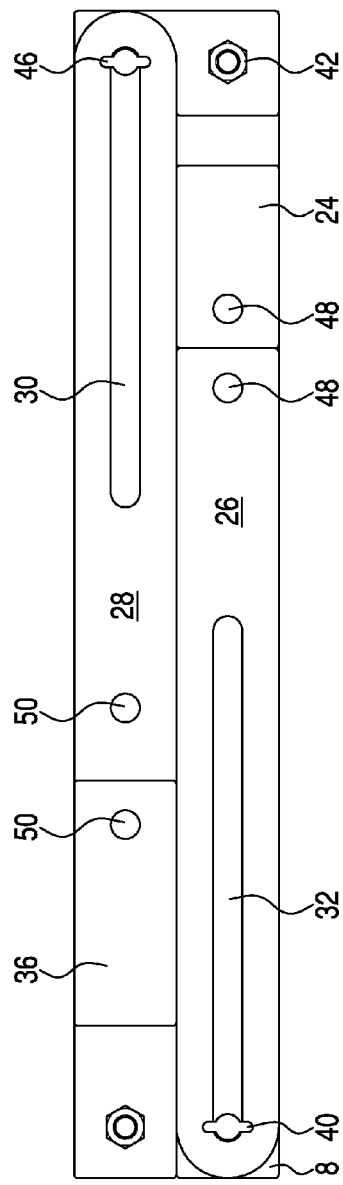
FIG. 2 is a bottom plan view of the invention in the closed position.

FIG. 2 shows the bottom view of the invention 100 which shows arms 28, 26 which are pinned by lockable pin members or thumb screws 46 40. Arm 26 includes a hinged extension price 24 and arm 28 includes a hinged extension piece 36. The extension pieces 24, 36 can be folded over to create a level surface for a portable grill to sit on as shown in FIG. 4. Threaded apertures 50 align with each other when extension piece is folded over. Threaded apertures 48 align with each other when extension piece 24 is folded over. Both apertures 48, 50 allow a person to insert [[a]] threaded posts and feet 72, 76.

Figure 3:
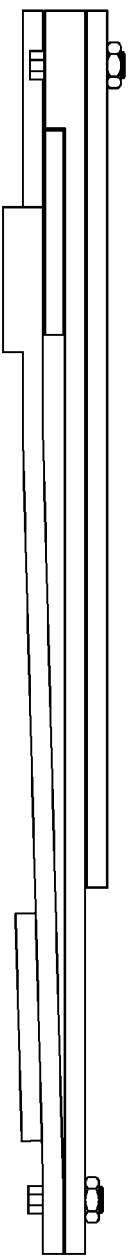
FIG. 3 is a side view of the invention in the closed position.

FIG. 3 shows a side view of the invention and shows how all pieces stack on top of each other when in the closed, storage position.

Figure 6:
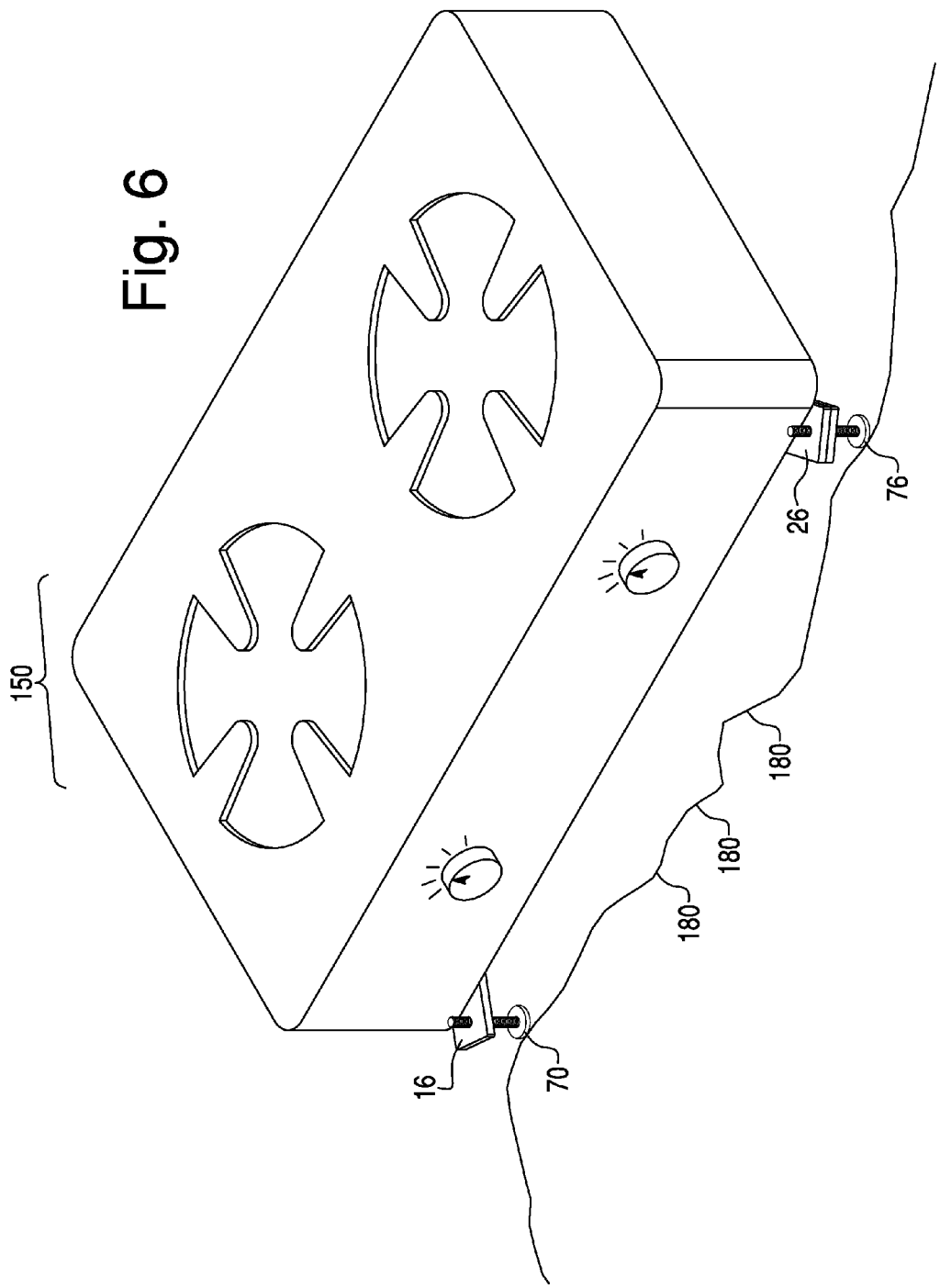
FIG. 6 is a perspective view of the invention in use with a portable stove.

FIG. 4 shows a top view of the invention in the use position. Arms 2, 26, 16, 28 are swung out from main spine elongate members 8, 20. Threaded posts 70, 72, 74, 76 are threaded into mating apertures at the end of each arm. Integral pads 24, 36 are level with the top surface of main spine members 8, 20. Slot 60 allows thumb screw 90 to be loosened or tightened to allow spine members 8, 20 to slide out from each other and be set to the desired length depending on the size of the portable grill being leveled. The portable grill 150 as shown in FIG. 6, sits on the ends of arms 16, 26, 2, 28. The threaded posts 70, 72, 74, 76 can be turned clock-wise or counter clock-wise depending on the level of the terrain 180 directly under the grill 150.

FIG. 5 shows a bottom view of the invention. In this view, spine members 8, 20 have been extended outward and arm members 2, 26, 16, 28 swing out into the use position and adjusted in length to accommodate a particular size of portable grill. Thumb screws 40, 46 are tightened at a mid point location on slot 30, 32 of arms 26, 28. The same is true for the other three arms 16, 28, 2. Spine member 20 includes an integral tab 80. An aperture in tab 80 coincides with slot 60 to allow screw 90A to be tightened by thumb screw 90 as shown in FIG. 4. In the above described way, the invention 100 can be adjusted in size to accommodate a variety of sizes of portable grills.

Figure 7:
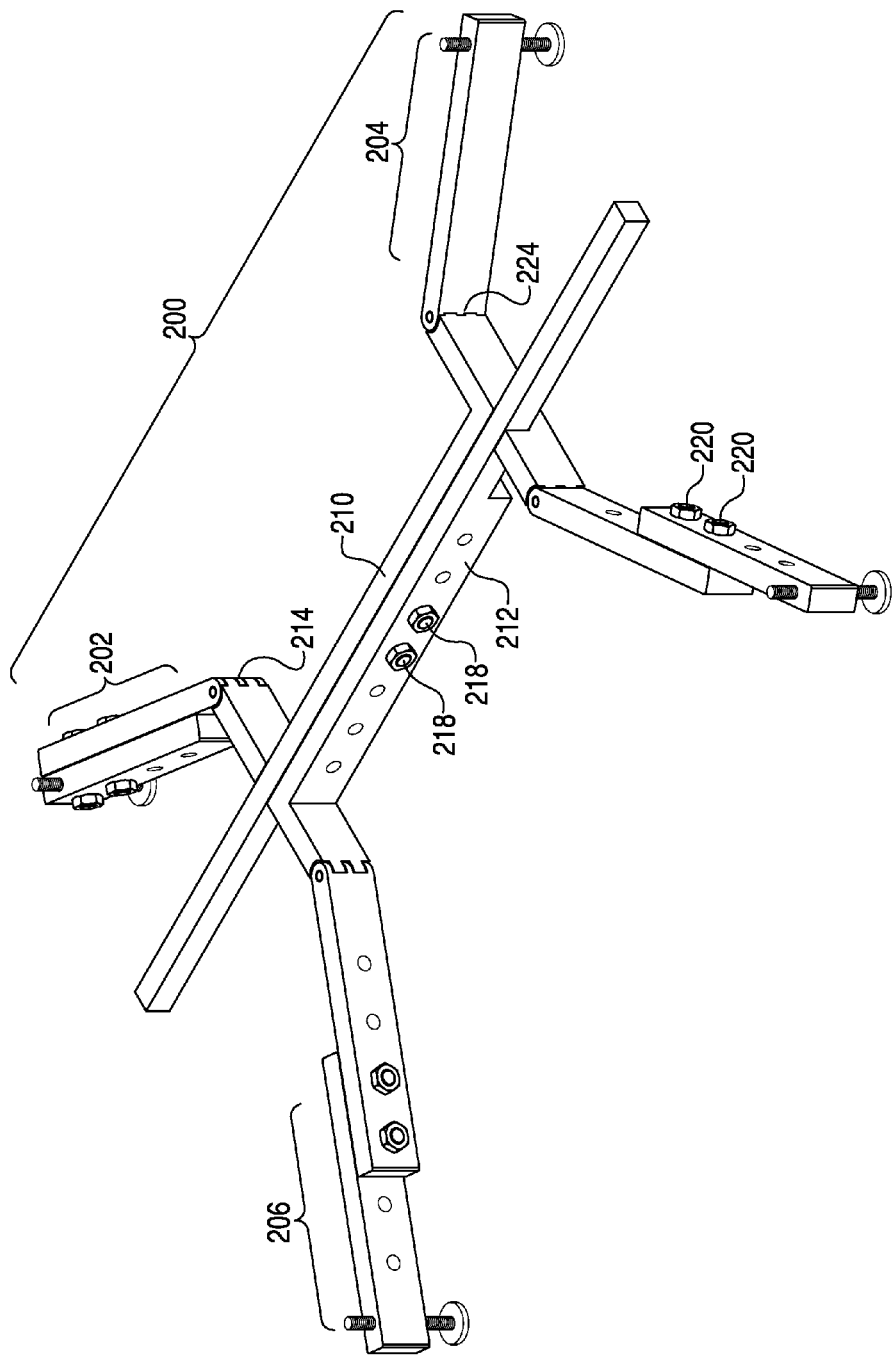
FIG. 7 is a perspective view of an alternate embodiment of the invention.

FIG. 7 shows an alternate embodiment of the invention 200. In this embodiment central spine members 210, 212 are pinned together by standard screws 218. The arms are also extendable and held together by screws 220 as shown in arm 208. The Spine members and arms can also be fixed together by the slot and thumb screw method as shown in the preferred embodiment in FIG. 4.

Figure 8:
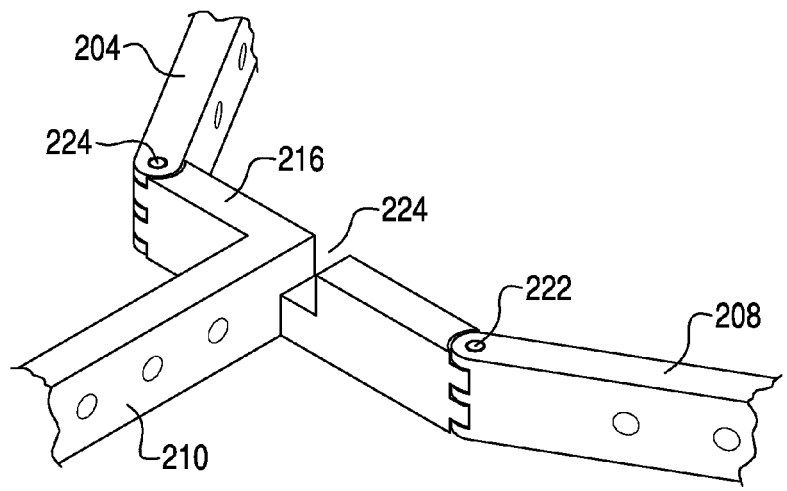
FIG. 8 is a partial perspective view of the alternate embodiment of the invention.

FIG. 8 shows a detail partial view of one end of the alternate embodiment 200. Spine piece 210 is fixed to T member 216. The notch 224 in T member 216 allows spine member 212 to slide through. Hinge members 222, 224 allow arms 204, 208 to swing out as needed. The arms can also be folded completely in towards the spine members 210, 212 for compact storage.

Obviously, either version of the above described portable stove leveling devices can be built into the underside of a stove by the manufacturer of the stove.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A leveling device for a portable stove comprising:
    a first rigid elongated spine member;
    a second rigid elongated spine member;
    four rigid elongated arms, wherein two of said four rigid elongated arms each comprises a foldable extension piece for creating a level surface for the portable stove;
    four metal threaded posts;
    said first elongated spine member having a centrally located elongated slot;
    said second elongated spine member having an integral tab portion;
    said tab portion having an aperture that accepts a threaded screw;
    said threaded screw slidably fixed to said elongated slot in said first elongated spine member;
    said elongated arms each having a centrally located elongated slot;
    wherein said first and second rigid elongated spine members lie in a horizontal plane;
    first and second arms of said four elongated arms each rotatably pinned through a respective said elongated slot of said first and second arms to each end of opposite ends of said first elongated spine member and third and fourth arms of said four elongated arms each being pinned through a respective said elongated slot of said third and fourth arms to opposite ends of said second elongated spine member, wherein two of said four rigid elongated arms are disposed above said horizontal plane and two of said four rigid elongated arms are disposed below said horizontal plane;
    said four metal threaded posts each screwed into a mating threaded aperture at each a distal end of each of said elongated arms;
    said first and second elongated spine members capable of being extended via said elongated slot in said first elongated spine member; and
    said four rigid elongated arms capable of being rotated and extended or retracted to accommodate the size of a base of said portable stove so that said portable stove may be placed on top of said first and second spine members and said four arms and said threaded posts can be adjusted to accommodate any irregularities in a terrain said stove would otherwise be resting upon, wherein said four arms are configured to be collapsed onto surfaces of said spine members for ease of storage.

2. A leveling device for a portable stove as claimed in claim 1 wherein said first and second arms of said four elongated arms are configured to be rotated to be adjacent opposite surfaces of said first spine member and said third and fourth arms are configured to be rotated to be adjacent opposite surfaces of said second spine member for compact storage and shipping.

3. A leveling device for a portable stove as claimed in claim 1 wherein said elongated members are all constructed of at least one of a metal and a rigid plastic.

4. A leveling device for a portable stove comprising:
    a first rigid elongated spine member, said first elongated spine member having a centrally located elongated slot;
    a second rigid elongated spine member having an integral tab portion, said tab portion having an aperture that accepts a connector, said connector slidably fixed to said elongated slot in said first elongated spine member;
    four rigid elongated arms, each having a centrally located elongated slot;
    first and second arms of said four elongated arms each rotatably pinned through a respective said elongated slot of said first and second arms to opposite ends of said first elongated spine member and third and fourth arms of said four elongated arms each being pinned through a respective said elongated slot of said third and fourth arms to opposite ends of said second elongated spine member;

said first and second elongated spine members capable of being extended via said elongated slot in said first elongated spine member;

wherein said first and second rigid elongated spine members lie in a horizontal plane, and wherein two of said four rigid elongated arms are disposed above said horizontal plane and two of said four rigid elongated arms are disposed below said horizontal plane.

5. A leveling device according to claim 4, further comprising four metal threaded posts each screwed into a mating threaded aperture at a distal end of each of said elongated arms.

6. A leveling device according to claim 4, wherein said first and second arms of said four elongated arms are configured to be rotated to be adjacent opposite surfaces of said first spine member and said third and fourth arms are configured to be rotated to be adjacent opposite surfaces of said second spine member for compact storage and shipping.

* * * * *